July 2, 1935.  V. BENDIX  2,006,382
BRAKING SYSTEM
Original Filed Jan. 30, 1928
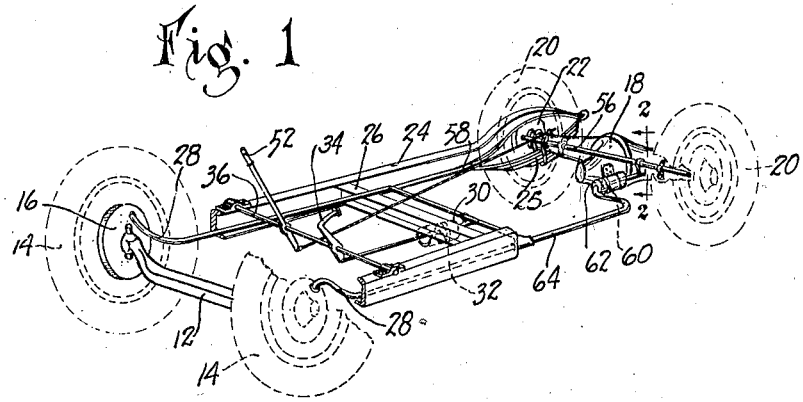
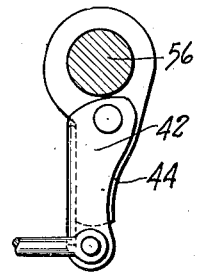
INVENTOR.
Vincent Bendix
BY Jerome R. Cox
ATTORNEY.

Patented July 2, 1935

2,006,382

UNITED STATES PATENT OFFICE 2,006,382

BRAKING SYSTEM

Vincent Bendix, Chicago, Ill., assignor to Bendix Aviation Corporation, South Bend, Ind., a corporation of Delaware Original application January 30, 1928, Serial No. 250,397. Divided and this application April 15, 1932, Serial No. 605,497

1 Claim. (Cl. 188—10)

This invention relates to braking systems, and is illustrated as embodied in an automobile chassis having a system of four-wheel brakes.

An object of the invention is to simplify the engineering of the chassis by using hydraulic operating connections for one set of brakes, for example the front brakes, which hydraulic connections additionally operate the other set of brakes through mechanical connections.

The mechanical connections are illustrated as including a rockshaft supported on the rear axle, said rockshaft being mechanically connected to the rear brakes.

According to an important feature of the invention, in case of failure of the hydraulic connections the rear brakes can be operated through the above described mechanical connections, by auxiliary mechanical means such as the usual emergency hand lever. This hand lever is also used in parking. An important feature of the invention is in providing a one-way connection between the mechanical connections and the hydraulic system, so that the latter is not affected by use of the emergency lever in parking, thereby eliminating prolonged use of the hydraulic system under high pressure, which might eventually cause leakage if the hydraulic brakes were used in parking, and also eliminating suction on the hydraulic system due to independent use of the mechanical brakes.

The above and other objects and features of the invention, including various novel combinations of parts and desirable particular constructions, will be apparent from the following description of two illustrative embodiments shown in the accompanying drawing in which:

Figure 1 is a diagrammatic perspective view of an automobile chassis, showing the above-described braking system with the rockshaft for the rear brakes mounted on the rear axle; and Figure 2 is a partial section on the line 2—2 of Figure 1, showing the one-way connection between the shaft and the hydraulic system.

The automobile or other vehicle has a front axle 12 carried by road wheels 14 having a set of hydraulic brakes 16 of any desired construction, and a rear drive axle 18 supported on road wheels 20 having a set of mechanical brakes 22 of any desired construction. The front and rear axles support, in the usual manner, a chassis frame 24 mounted on spring 25 shown as having a cross member 26.

The hydraulic front set of brakes is operated by conduits or flexible connections 28 from a master cylinder 30. Pressure is provided in the cylinder 30 by any usual type of master piston 32 connected to the usual foot pedal 34. For convenience of illustration, pedal 34 is shown fulcrumed on a support 36 carried by the chassis frame, although ordinarily it would be mounted on the transmission or clutch housing in the usual manner.

In the arrangement shown, the rear brakes 22 are operated by a rockshaft 56, which is mounted on the rear axle. Shaft 56 is operated either by a cable or the like 58 from a hand lever 52, or through an operating piston 60 and cylinder 62 connected by a conduit 64 to the above-described hydraulic system. One advantage of this arrangement is that the movements of the rear axle are compensated by the flexibility of conduit 64. Inasmuch as the area of the piston 60 remains constant and the areas of the operating cylinders for the front wheel brakes also remain constant, braking force applied to the pedal is always transmitted in fixed proportion to the front brakes and in fixed proportion to the rear brakes.

Shaft 56 is operated by the hydraulic cylinder 62 through a one-way operating device, so that emergency operation of the rear brakes, for parking or the like, will not in any way affect the hydraulic system. The particular one-way device shown includes a channel-section lever 42 pivotally embracing an arm 44 fixed on shaft 56, and connected to a rod operated by the piston 60 in the operating cylinder 62 communicating with the hydraulic connections 64. Thus it will be seen that piston 60 operates shaft 56 but shaft 56 does not operate piston 60.

This application is a division of my co-pending application Serial No. 250,397.

While an illustrative embodiment of the invention has been described in detail, it is not my intention to limit its scope to the particular embodiments shown or otherwise than by the terms of the appended claim.

I claim:

In a device of the character described, a chassis, a pair of steerable wheels supporting a portion of said chassis, an axle rearwardly of said wheels and resiliently supporting a portion of said chassis, rear wheels supporting said axle, a foot pedal mounted on said chassis, a master cylinder controlled by said pedal and fixed relative to said chassis, an operating cylinder mounted fixedly relative to said axle, brakes for said rear wheels, mechanical connections extending from said operating cylinder to both of said rear wheel brakes, liquid pressure connections extending from said master cylinder to said operating cylinder, hydraulic operating means for said steerable wheel brakes, liquid connections between said master cylinder and said hydraulic operating means, a piston in said master cylinder, means connecting said foot pedal and said piston whereby braking force applied to said foot pedal is transmitted in a fixed proportion to said rear brakes and is transmitted in a fixed proportion to said steerable wheel brakes.

VINCENT BENDIX.